United States Patent
Eberstaller et al.

(10) Patent No.: US 6,465,533 B1
(45) Date of Patent: Oct. 15, 2002

(54) PARTICULATE-SHAPED, EXPANDABLE STYROL POLYMERS AND METHOD FOR THE PRODUCTION THEREOF

(75) Inventors: Roman Eberstaller, Obergrafendorf (AT); Mariacarla Arduini-Schuster, Kürnach; Joachim Kuhn, Würzburg, both of (DE)

(73) Assignee: SUNPOR Kunstoff Ges. m.b.H., St. Poelten (AT)

( * ) Notice: Subject to any disclaimer, the term of this patent is extended or adjusted under 35 U.S.C. 154(b) by 0 days.

(21) Appl. No.: 09/889,989

(22) PCT Filed: Jan. 20, 2000

(86) PCT No.: PCT/AT00/00013

§ 371 (c)(1),
(2), (4) Date: Jul. 24, 2001

(87) PCT Pub. No.: WO00/43442

PCT Pub. Date: Jul. 27, 2000

(30) Foreign Application Priority Data

Jan. 25, 1999 (AT) .................................................. 99/99

(51) Int. Cl.[7] .................................................. C08J 9/00
(52) U.S. Cl. ........................................... 521/79; 521/92
(58) Field of Search ...................................... 521/92, 79

(56) References Cited

PUBLICATIONS

Patent Abstracts of Japan, Pulication No. 56010432 and Date Feb. 02, 2001 and Application Date and No. Jun. 07, 1979 and 54085755, Inventor Takeo.*

* cited by examiner

*Primary Examiner*—Morton Foelak
(74) *Attorney, Agent, or Firm*—Townsend and Townsend and Crew LLP

(57) ABSTRACT

Particulate, expandable styrene polymers capable of being processed into hard foamed plastic materials of a small density and containing, therefore, at least one foaming agent comprise at least aluminum in a particulate form for improving their thermal insulation properties. The styrene polymer particles comprise, after their expansion, a fine cell structure and contain the aluminum particles incorporated in a homogeneous distribution as an infrared ray reflecting material. The main proportion of these aluminum particles has the shape of platelets having a size between 1 and 15 $\mu$m. Styrene polymer particles produced in this manner can be foamed into plastic materials of foamed polystyrene particles which have a density of 30 g/l in maximum and improved heat insulation characteristics.

27 Claims, No Drawings

PARTICULATE-SHAPED, EXPANDABLE STYROL POLYMERS AND METHOD FOR THE PRODUCTION THEREOF

The invention relates to particulate, expandable styrene polymers (EPS) capable of being processed into hard foamed plastic materials having a fine cellular structure and a small density, containing, therefore, at least one foaming agent, and comprising at least aluminum in particle shape for improving their thermal insulation properties. Furthermore, the invention relates to a method for producing such expandable styrene polymer particles.

Styrene polymer particles (EPS) of the above mentioned type are known (EP 620,246 A). It deals with polystyrene particles which contain a foaming agent and can be expanded by heating with steam (pre-foaming procedure), thus multiplying their volume, and which can be processed afterwards into shaped parts of any shape, particularly into blocks, by heat-sealing. Preferred applications of such foams of polystyrene particles are heat insulation plastics, e.g. for the facade walls of buildings, cold storages or packaging materials, the thermal insulation effect of the foamed plastic being of decisive importance for its quality. Therefore, it has already been suggested to reduce the ability of heat conduction of hard foamed polystyrene plastic materials by adding some additives to the styrene polymer which reduce the permeability for infrared radiation through the foamed plastic. From the above-mentioned document it is known to this end to use athermanous materials, i.e. infrared radiation absorbing materials, for which purpose metal oxides, e.g. $Al_2O_3$, non-metallic oxides, aluminum powder or carbon black or graphite are suggested. In particular, these additives should be used for coating the surface of the polystyrene particles. However, this method has the disadvantage that an undefined proportion of this coating will be lost during processing which leads to a likewisely undefined reduction of heat insulation and, moreover, to contamination of waste water. Furthermore, such a surface coating of the polystyrene particles will result in a substantial impairment of the heat-sealing properties of the polystyrene particles due to a separating effect which in turn, leads to higher heat conductivity and to a reduced mechanical strength of the respective part of hard foamed plastic.

Certainly, it is also known from the above-mentioned document to embed athermanous materials into not yet foamed granules for forming the hard polystyrene foam, particularly together with a foaming agent. However, the results obtained were not sufficient up to now, because difficulties occurred with embedding the athermanous materials. Normally, EPS is produced by suspension polymerization. This is done by suspending styrene in water while stirring so that droplets are formed which are polymerized by means of reaction ini-produced by suspension polymerization. This is done by suspending styrene in water while stirring so that droplets are formed which are polymerized by means of reaction initiators and are impregnated with the foaming agent in the course of the procedure. The athermanous materials, however, cannot simply be added, because these materials are insoluble in styrene and are, therefore, not absorbed by the droplets. Likewise, introducing the athermanous materials into EPS by mixing these materials with a melt of polystyrene in an extrusion process was not satisfying. In this process, polystyrene is heated together with the additives and the foaming agent up to a temperature above the glass point of polystyrene, is mixed by friction, cooled and pressed through a perforated die. Immediately after leaving the die, the extruded strand has to be cooled by a bath of cold water in order to prevent foaming. The cooled strand is then granulated into short individual particles. However, the problem occurs that the suggested athermanous materials have a strong nuclei forming effect so that foaming of the material cannot be prevented after leaving the die. This nuclei forming effect depends on concentration, size, shape and composition of the nuclei forming material as well as on the melt temperature, the content of foaming agent and the formulation of the polystyrene used.

These properties of the athermanous materials require subaqueous granulating under pressure in order to prevent foaming of the granular particles. This involves a substantially higher expenditure than the usual granulation of a strand, and it is not possible to attain particle sizes of the granules below 1 mm by this type of granulation. Furthermore, the admixture of carbon black or graphite increases inflammability of the foamed particles which makes it necessary to increase the addition in flame protection systems to be able to achieve fire characteristics admissible in the field of civil engineering. Moreover, it is to be observed that produced insulating plates may heat up strongly and, thus, will deform when stored in open air and sun shine due to the property of athermanous materials, particularly carbon black or graphite, of absorbing infrared radiation.

The procedure described (EPS) differs basically from the production of plates of foamed plastic material (XPS) wherein foaming occurs directly at the nozzle of an extruder (DE 195 45 097 A1). In this type of process, inorganic materials are added in an aimed manner to the mass of plastic material to be extruded in order to provoke foaming of the plastic mass after leaving the nozzle. Thus, adding athermanous materials, which provoke precisely this foaming, is no problem in this process.

It is an object of the invention to improve particulate, expandable styrene polymers (EPS) of the type described at the outset in such a manner that the difficulties discussed are avoided, in particular so that no difficulties arise with embedding heat insulating aluminum particles, and that heat insulating properties as well as the sensitivity to sun rays of the styrene polymers produced are improved. The invention solves this problem in that the styrene polymer particles contain the aluminum particles incorporated in a homogetiators distribution as an infrared radiation reflecting material, the main proportion of the aluminum particles being in the form of platelets having a size between 1 and 15 $\mu$m. In a distribution as an infrared radiation reflecting material, the main proportion of the aluminum particles being present as platelets having a maximum size of between 1 and 15 $\mu$m each. In a surprising manner it has been shown that the admixture of aluminum platelets of the above-mentioned size, when distributed homogeneously in the styrene polymer, does not only not impair the fine cellular structure of the expanded styrene polymer particles in any way, which is attained by appropriate organic nuclei forming agents, e.g. paraffins, chlorparaffins, Fischer-Tropsch waxes as well as ester and amides of fatty acids, but that also substantially improved heat insulation characteristics of the styrene polymer particles and of the hard foamed plastic materials produced from them will result. Thus, the aluminum particles do not disturb the nuclei formation. Above all, the shape of platelets of the aluminum particles results in a larger surface area of the aluminum particles as compared to a spherical shape and, thus, they act strongly reflecting to incident infrared radiation. Optimum result will be obtained if the maximum diameter of the aluminum platelets amounts to at least the 10-fold of the medium thickness of the platelets. It may be put down to the strong reflection effect of the embedded aluminum platelets that the above-mentioned disadvantage of known insulating plates produced from EPS styrene polymer particles, i.e. to heat up considerably by sun radiation and then to deform, is avoided, because, due to the reflection of the infrared radiation, no remarkable absorption of it takes place.

For producing a dielectric material for a radar reflector it is known (JP-A-56010432 and Derwent Abstract AN 1981-22167D) to impregnate polystrene with a foaming agent and to add aluminum platelets having a surface area of 0.4 to 1 mm$^2$. The mixture thus produced is extruded, and the strands obtained are cut into pellets. This document gives no indication to reflection of infrared radiation for improving the heat insulating characteristics of a styrene polymer.

The homogeneous cellular structure of expanded foamed plastic beads obtained in accordance with the invention has an average cell size of about 0.1 mm, the cell size being between about 0.05 and 0.2 mm.

In the context of the present invention "styrene polymers" should mean polystyrene and blended polymers of styrene with other compounds, e.g. α-methyl styrene, acryl nitrile, maleic acid anhydride, butadiene or divinyl benzene.

As a foaming agent, gaseous or liquid hydrocarbons having a boiling point below the softening point of the polymer should be considered under normal conditions. Typical representatives of these compounds are propane, butane, pentane and hexane.

Furthermore, all usual adjuvants, such as nuclei forming agents, flame protective agents, UV stabilizers, softening agents, pigments, antioxigenes and acid catchers, can be used.

A further advantage of the invention consists in that it enables reducing the proportion of infrared radiation influencing agents more than it was possible up to now, nevertheless maintaining the same effect or even a better one. Thus, it is possible within the scope of the invention that the styrene polymer particles contain less than 6% by weight of aluminum particles in relation to the polymer, preferably 0.05 to 4% by weight and particularly 0.3 to 1% by weight. In this way, not only material to be incorporated is saved, but the aluminum platelets described in so small a concentration do not impair the formation of nuclei, while exhibiting a sufficient reflection of infrared light.

The aluminum platelets, which are irregularly defined, very smooth, plane and thin, have dimensions which are not equal in every direction. Within the scope of the invention, it is preferred if at least 95% of the aluminum particles have their largest dimension of 15 μm in maximum.

Although a substantial improvement of the heat insulation characteristics will result already by using the aluminum platelets in the manner described, it does not mean that no further improvement might be achieved by using additional materials. Thus, further advantages are obtained according to the invention if still further infrared radiation reflecting or heat insulation properties increasing particulate materials are contained in addition to the aluminum particles in platelet form which are incorporated into the styrene polymer particles in a homogeneous distribution. As such a particularly suitable material, antimony trisulfide ($Sb_2S_3$) is adapted within the scope of the invention. With this, a synergetic effect is obtained between the aluminum platelets and the antimony trisulfide particles, because the former ones act in a reflecting manner onto infrared radiation, while the latter ones predominantly are absorbing. This gives some advantage if absorption of infrared radiation is desired or tolerable. To increase the efficiency in such a case, it is convenient to dimension the antimony trisulfide particles somewhat larger than the aluminum particles, the antimony trisulfide particles having, in particular, a grain size of 10 to 60 μm.

It is also possible within the scope of the invention to increase the property of heat insulation by additionally adding carbon black and/or graphite in the form of fine particles, the proportion of carbon black or graphite, however, amounting to less than 2% by weight in relation to the mon, the proportion of aluminum particles used amounting to 6% by weight in maximum, preferably 5% by weight in maximum, particularly 4% by weight in maximum, after which the extruded product is immediately cooled and comminuted into particles, particularly granulated. This immediate cooling avoids foaming of the particles. The extrusion may be performed as a subaqueous granulation under pressure wherein it is tolerable within the scope of the invention to chose the proportion of aluminum particles used higher than in a normal extrusion, i.e. 6% by weight in maximum in relation to the polymer in the case of subaqueous granulation under pressure.

Particulate, expandable styrene polymers produced in accordance with the invention which contain aluminum particles distributed homogeneously can be formed in a manner usual per se to a density of 30 g/l in maximum. Thus, the foamed polystyrene bodies are very light, but nevertheless very strong. Their heat insulating characteristics, as compared with known products, are substantially better.

Foamed plastic materials of polystyrene particles produced in accordance with the invention can be used in an advantageous manner as a heat insulation of all kind, particularly for heat insulating buildings and parts of buildings, e.g. facade walls, cold storages and so on, moreover for the thermal insulation of machines and appliances of all kind or as a packaging material for those objects which are to be protected against heat influence.

The following examples will explain the invention in detail. The percentages mentioned are related to the weight of the polymer.

EXAMPLE 1

Polystyrene of a molecular weight of about 220,000 together with 1.3% hexabromocyclododecane and 0.2% dicumyle as a fireproofing agent and 0.3% aluminum platelets of an average maximum size of 3 μm were melted in an extruder, mixed with 6.3% pentane, cooled to about 120° C. and pressed through a perforated die. The resulting strands of a diameter of about 0.8 mm were cooled below the solidification temperature in a cold water bath and were subsequently granulated by means of a strand granulator.

The resulting granulate was coated by coating materials as usual for this purpose (glycerol stearate or zinc stearate) to prevent sticking during the foaming procedure, and was then pre-foamed to a density of 15 g/l in a discontinuous pre-foamer. The cellular structure of the foamed plastic beads thus obtained was homogeneous and had an average cell size of about 0.1 mm. After intermediate storage during 24 hours, blocks of the dimensions of 600×600×190 mm were produced and were cut by means of a hot wire into plates having a thickness of 50 mm. The two middle plates were used for measuring the heat conductivity after storage up to some constancy of weight.

Plates produced in this manner had a heat-transfer coefficient of 35.8 mW/m.K.

EXAMPLE 2

One proceeded as in example 1, but the average maximum size of the aluminum platelets used was 5 μm.

The plates produced in this manner had a heat-transfer coefficient of 34.2.

EXAMPLE 3

One proceeded as in example 1, but aluminum platelets were used having an average maximum dimension of 15 μm.

The plates produced in this manner had a heat-transfer coefficient of 36.5 mW/m.K.

EXAMPLE 4

One proceeded as in example 1, but the concentration of the proportion of aluminum platelets was chosen to be 0.8%.

The plates produced in this manner had a heat-transfer coefficient of 34.3 mW/m.K.

EXAMPLE 5

One proceeded as in example 2, but the concentration of the proportion of aluminum platelets was chosen to be 0.8%.

Plates produced in this manner had a heat-transfer coefficient of 32.6 mW/m.K.

EXAMPLE 6

One proceeded as in example 3, but the concentration of the proportion of aluminum was chosen to be 0.8%.

Plates produced in this manner had a heat-transfer coefficient of 35.0 mW/m.K.

EXAMPLE 7

One proceeded as in example 1, but 0.5% antimony trisulfide particles having a grain size of about 35 μm were used in addition to the aluminum platelets.

Plates produced in this manner had a heat-transfer coefficient of 33.8 mW/m.K.

EXAMPLE 8

One proceeded as in example 1, but 0.5% of fine carbon black particles were used in addition to the aluminum platelets.

Plates produced in this manner had a heat-transfer coefficient of 34.0 mW/m.K.

EXAMPLE 9

One proceeded as in example 1, but 0.5% of fine graphite particles were used in addition to the aluminum platelets.

Plates produced in this manner had a heat-transfer coefficient of 34.2 mW/m.K.

EXAMPLE 10

For comparison purposes, one proceeded as in example 1, but without any addition of aluminum platelets.

Plates produced in this manner had a heat-transfer coefficient of 37.3 mW/m.K.

The results show that the heat-transfer coefficient varies with the particle size of the aluminum platelets used, the best values being at an average particle size of about 5 μm.

Likewise, the heat-transfer coefficient varies with concentration of the aluminum particles used, a proportion of 0.8% of aluminum platelets (the method remaining otherwise unchanged) resulting in better values than a proportion of 0.3% only. However, even the latter proportion resulted in better values than when producing plates without any aluminum particles.

The materials produced in these tests showed no decline of fire characteristics due to the small concentration of aluminum, and no foaming during production of the raw material granulate.

Reduction of heat-sealing quality or of the mechanical properties could also not be observed.

Furthermore, it has shown that the use of aluminum platelets, which, in contrast to carbon, act as infrared reflectors, does not cause elevated heating up by exposure to solar light.

The material produced from aluminum particles of a platelet size of 5 μm at a concentration of 0.8% provides an insulating effect corresponding to the heat conductivity group of 035.

What is claimed is:

1. Particulate, expandable styrene polymers (EPS) capable of being processed into hard foamed plastic material having a fine cell structure and a small density, containing, therefore, at least one foaming agent, and comprising at least aluminum in particle shape as an infrared radiation insulating material for improving their thermal insulation properties, characterized in that the styrene polymer particles contain the aluminum particles incorporated in a homogeneous distribution as an infrared ray reflecting material, the main proportion of the aluminum particles being present as platelets whose maximum size is between 1 and 15 μm each.

2. Styrene polymers according to claim 1, characterized in that the maximum diameter of the aluminum platelets is at least the 10-fold of the medium thickness of the platelets.

3. Styrene polymers according to claim 1, comprising less than 6% by weight of aluminum particles in relation to the polymer.

4. Styrene polymers according to claim 3, characterized in that they contain 0.05 to 4% by weight of aluminum particles.

5. Styrene polymers according to claim 3, characterized in that they contain 0.3 to 1% by weight of aluminum particles.

6. Styrene polymers according to claim 1, characterized in that at least 95% of the aluminum particles have their largest dimension of 15 μm in maximum.

7. Styrene polymers according to claim 1, characterized in that still further infrared radiation insulating or heat insulation properties increasing particulate materials are contained in addition to the aluminum particles in platelet form which are incorporated into the styrene polymer particles in a homogeneous distribution.

8. Styrene polymers according to claim 7, characterized in that antimony trisulfide particles are contained in the styrene polymer particles.

9. Styrene polymers according to claim 8, characterized in that the antimony trisulfide particles are larger than the aluminum particles.

10. Styrene polymers according to claim 9, characterized in that the antimony trisulfide particles have a grain size of 10 to 60 μm.

11. Styrene polymers according to claim 7, characterized in that carbon black and/or graphite in the form of fine particles are contained in the styrene polymer particles, the proportion of carbon black or graphite amounting to less than 2% by weight in relation to the polymer.

12. Styrene polymers according to claim 1, characterized in that they are able to be processed into foamed polystyrene particles having a homogeneous cell structure and cell size between 0.05 and 0.2 mm.

13. Method for producing particulate, expandable styrene polymers according to claim 1, characterized in that styrene and/or compounds of it is polymerized together with at least one foaming agent in a reactor, and 6% by weight in maximum of aluminum particles, the main proportion being in the form of platelets as a master batch, whose carrier material is polystyrene, are added in the course of the polymerization.

14. Method for producing particulate, expandable styrene polymers according to claim 1, characterized in that styrene polymers are melted in an extruder and mixed with at least one foaming agent and aluminum particles having a main proportion in the form of platelets and are extruded in common, the proportion of aluminum particles having used amounting to 6% by weight in maximum, after which the extruded product is immediately cooled and comminuted into particles.

15. Method according to claim 13, characterized in that the proportion of aluminum particles amounts to 5% by weight in maximum.

16. Method according to claim 13, characterized in that the proportion of aluminum particles amounts to 4% by weight in maximum.

17. Method according to claim 14, characterized in that the extruded product is granulated.

18. Method according to claim 14, characterized in that the extrusion is performed as a subaqueous granulation under pressure.

19. Method for producing foamed polystyrene plastic materials, characterized in that aluminum particles in a homogeneous distribution containing expandable styrene polymer particles according to claim 1 are foamed to a density of 30 g/l in maximum.

20. Polystyrene particle foamed materials from EPS particles, characterized in that they have a density of 30 g/l in maximum and contain aluminum platelets in a homogeneous distribution, the main proportion of which having dimensions between 1 and 15 $\mu$m.

21. Polystyrene particle foamed materials according to claim 14, characterized in that the proportion of aluminum platelets amounts to less than 6% by weight in relation to the polymer.

22. Polystyrene particle foamed materials according to claim 14, characterized in that the proportion of aluminum platelets amounts to 0.05 to 4% by weight.

23. Polystyrene particle foamed materials according to claim 14, characterized in that the proportion of aluminum platelets amounts to 0.3 to 1% by weight.

24. Polystyrene particle foamed materials, characterized in that they contain aluminum particles and antimony trisulfide particles distributed homogeneously.

25. Heat insulation composition comprising polystyrene foam particle having a density of no more than 30 grams per liter and including aluminum platelets in homogeneous distribution, a main portion of the aluminum platelets having a dimension between 1 and 15$\mu$.

26. Styrene polymers according to claim 3 comprising 0.05 to 4% by weight of aluminum particles in relation to the polymer.

27. Styrene polymers according to claim 3 comprising 0.3 to 1.0% by weight of aluminum particles in relation to the polymer.

* * * * *